Figure 1:
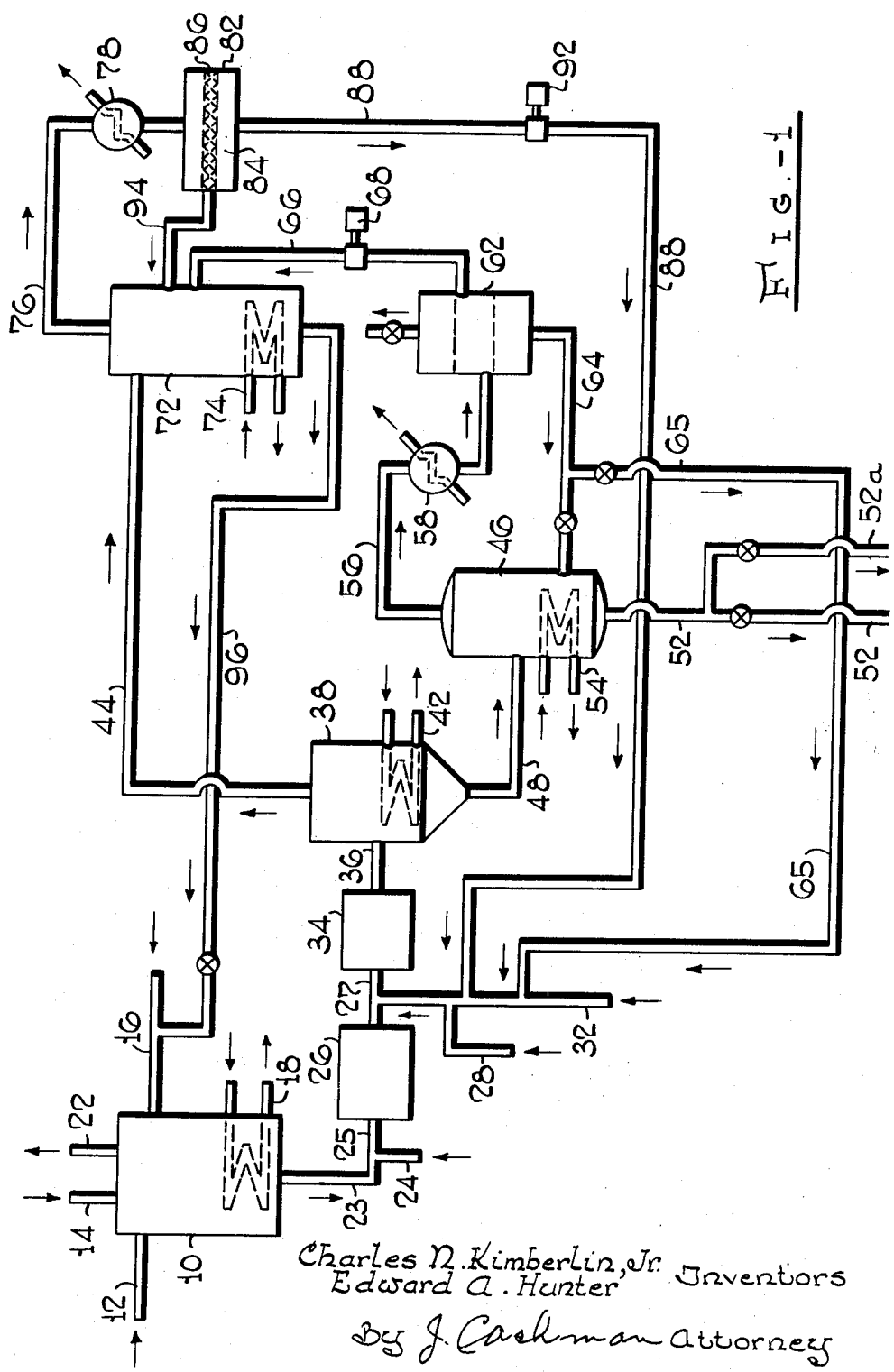
Figure 1A:
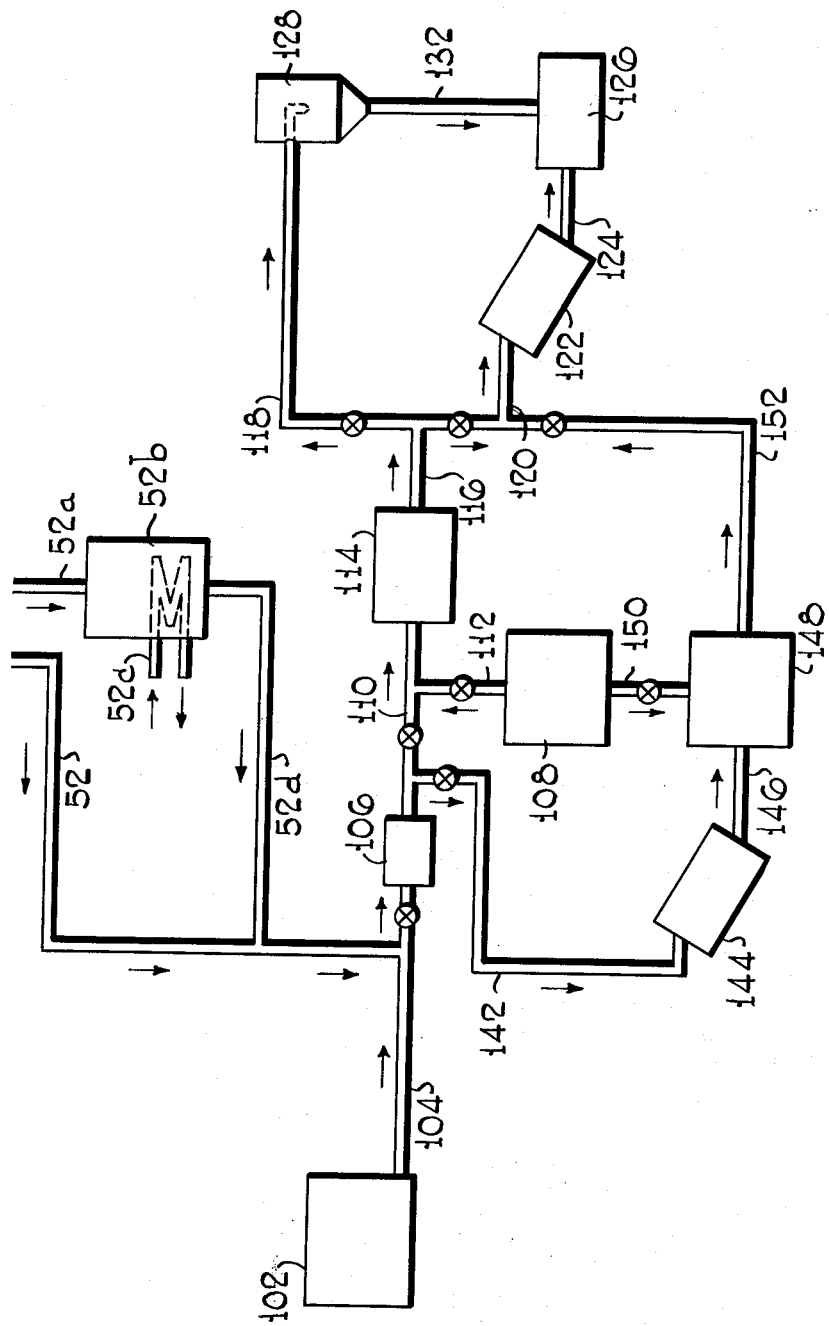

Sept. 11, 1956     C. N. KIMBERLIN, JR., ET AL     2,762,783
CATALYST MANUFACTURING PROCESS Filed Oct. 1, 1951     2 Sheets-Sheet 1

Charles N. Kimberlin, Jr.
Edward A. Hunter   Inventors

By J. Cashman   Attorney

2,762,783
CATALYST MANUFACTURING PROCESS

Charles N. Kimberlin, Jr., and Edward A. Hunter, Baton Rouge, La., assignors to Esso Research and Engineering Company, a corporation of Delaware Application October 1, 1951, Serial No. 249,174

8 Claims. (Cl. 252—463)

This invention relates to an improved method for making catalysts derived from alumina sols. More particularly, it relates to the preparation of improved catalysts comprising a zinc aluminate base, wherein the zinc aluminate has been derived from an alumina hydrosol.

The present application is a continuation-in-part of our copending application, Serial No. 214,158, filed March 6, 1951, on an "Improved Method for Making Alumina Hydrosols" now U. S. Patent No. 2,656,321, dated October 20, 1953.

While there are suggestions in the prior art of methods of making catalysts derived from alumina sols or hydrosols, there are no entirely satisfactory commercial processes for making these sols or hydrosols on a large scale. One process generally referred to is the Patrick process disclosed in U. S. Patent 2,258,099, wherein amalgamated aluminum metal is reacted with 1 to 5% aqueous acetic acid. This process is expensive and not readily reproducible, largely because the reaction proceeds very slowly. The Patrick process has been improved considerably by Kimberlin in U. S. Patent 2,453,847, by conducting the reaction in the presence of an oxidizing gas, but even with this improvement the reaction proceeds more slowly than desired. The use of organic acids as reactants or peptizing agents in the preparation of alumina sols has also been variously recommended. This method is satisfactory for the preparation of a very dilute sol, but sols of reasonably high concentration require the use of high amounts of acid. This is economically undesirable, and it also gives an alumina of less desirable properties for use as a catalyst component.

It is an object of the present invention to prepare from a stable alumina hydrosol a zinc aluminate catalyst base of improved properties. It is a further object to prepare such a base by an inexpensive method involving the preparation of an alumina hydrosol having a low content of peptizing acid and a relatively high concentration of alumina. It is a still further object to prepare from such a base hydrocarbon conversion catalysts having markedly higher activity than conventional catalyst preparations having the same nominal composition.

As the first step in this process, a solution of aluminum alcoholate is prepared by dissolving aluminum metal in the form of metal turnings or in other suitable form in a water insoluble alcohol. This may be amyl alcohol or a higher aliphatic alcohol, or a mixture of such alcohols. Instead of using the alcohol alone it is preferred to use a mixture of alcohol and a hydrocarbon or hydrocarbon oil. The reason for using a water insoluble alcohol or alcohol-oil mixture is that the alcohol or alcohol-hydrocarbon mixture can be easily recovered by phase separation, as shown in detail below, and re-used to make an economical process. While the water insoluble alcohols are preferred, water soluble alcohols may be used in which event the recovery of the alcohol involves a more expensive distillation step. It has been heretofore known to hydrolyze an aluminum alcoholate made from a water insoluble alcohol but such hydrolysis ordinarily results in a slurry of alumina in water.

According to the present invention an alumina sol or hydrosol is produced from a solution of aluminum alcoholate dissolved in excess alcohol or alcohol hydrocarbon mixture. The alcoholate solution is mixed with a peptizing agent such as an organic acid, to obtain a substantially anhydrous homogeneous solution containing aluminum alcoholate and the peptizing agent. This is contacted with water to hydrolyze the aluminum alcoholate, regenerating the water-insoluble alcohol. The aqueous phase obtained on hydrolysis is an alumina hydrosol containing from about 1 $HAc:30\ Al_2O_3$ to 1 $HAc:1\ Al_2O_3$ by weight, with preferably less than 1 weight percent acetic acid and about 3–6% $Al_2O_3$. The alcohol is recovered and re-used in the reaction step for making more aluminum alcoholate, operating in a continuous cycle.

The alumina sol or hydrosol produced is a stable one, dispersed uniformly throughout the aqueous phase, and it has definite advantages for use as a base in the preparation of catalysts. It may be used as such to form alumina gels, or it may be mixed with other catalytic elements such as a stable silica hydrosol or various other components in solution to make hydrocarbon conversion catalysts having any desired content of alumina. A very important advantage of the use of the stable alumina hydrosols of the present invention is that they may be mixed with other catalytic components while the mass is still in the sol stage, to give a homogeneous dispersion having uniform composition throughout. This has the two-fold result of giving more rapid and easy mixing of the various components than other methods of preparation, and also of giving a product of more uniform composition.

Another advantage of this method is that the alumina hydrosols thus prepared can be easily obtained in a much higher concentration than that attainable by most previous direct methods of making alumina sols. With either the Patrick method or the modified Patrick method described above, the practical limit of the concentration of the alumina sol which can be directly prepared is about 3%. Higher concentration can be obtained therefrom only by a two-step process involving the initial preparation of a dilute sol within this range, from which residual bits of aluminum must be removed by some suitable method such as settling and decantation. The apparent reason for this is that during the reaction which forms hydrated alumina from aluminum metal the particles of metal tend to become coated with a layer of alumina gel which is insoluble in the milieu. This slows the reaction and tends to prevent the complete transformation of the metal into alumina. The remaining bits of gel-coated metal act as coagulation centers, effectively preventing the preparation of a stable sol in high concentration in their presence. It is only after these residual bits of metal have been removed that the sol may be evaporated to a concentration in the range of from 3 to 6%.

In direct contrast to this previous experience, the sols of the present invention may be prepared initially in concentrations as high as those which can be obtained in the two stage operation described above. The product obtained from the aluminum metal is completely soluble in the reaction medium in this case, so that there is no non-homogeneous stage in the preparation. Stated somewhat differently, the alcoholate process cleans off the metal surface and keeps it clean, so that the reaction is easy to start and proceeds smoothly without localized differences in rate due to changes in the concentration of surface gel or various ions present. Many other variables responsible in some degree for the poor reproducibility of the Patrick sol preparation, such as metal surface texture, agitation control or reaction induction periods are found to have a smaller effect, if any in applicants' improved process. The excellent degree of dispersion of the resultant hydrosols, contrasted to that characteristic of hydrosols prepared by the conventional Patrick procedure, is shown in the following examples.

Example I

In a typical preparation according to the applicants' process, 8 liters of a solution of aluminum amylate in hydrocarbon containing about 43 g. $Al_2O_3$ per liter is mixed with 56 cc. glacial acetic acid. This solution is hydrolyzed by contacting with hot water on the impeller of a centrifugal pump, in a ratio of 2.9 volumes of water per volume of alcoholate solution. The organic layer is decanted. The aqueous hydrosol phase is held 1 hour at 175° F., extracted with ether to remove emulsion, and filtered. The product is a clear $Al_2O_3$ hydrosol containing about 3% $Al_2O_3$ and a weight ratio of $$1HAc : 6Al_2O_3$$

This hydrosol shows essentially no turbidity or opalescence, so that typescript could be easily read through a 5 or 6 inch layer of the sol.

Example II

In a conventional Patrick sol preparation, 32 grams of aluminum metal turnings is reacted with 2 liters of 0.5% acetic acid solution containing 0.04 g. $HgCl_2$, for 24 hours at 120–150° F. The product is filtered to produce an opalescent sol containing the same proportions of about 3% $Al_2O_3$ and a weight ratio of $$1HAc : 6Al_2O_3$$

as the sol in Example I. Even after filtration, however, the Patrick type sol is highly turbid and so nearly opaque that typescript could be read through a layer no thicker than about ¼ inch. This difference in turbidity indicates that the alcoholate sol is much more highly dispersed than the Patrick sol.

Example III

Example I, above is repeated except one-half the amount of acetic acid is used, yielding a hydrosol containing about 3% $Al_2O_3$ but having a weight ratio of $1HAc : 12Al_2O_3$. This sol is essentially as clear as the sample from Example I, showing again that the alcoholate process produces a more dispersed sol than does the Patrick process. In addition, the preparation of a much better sol with ½ the acetic acid content demonstrates that a far more efficient utilization of the peptizing agent is achieved in the alcoholate process.

A significant advantage of these stable alumina hydrosols is that the alumina gels or alumina-base catalysts prepared therefrom are less crystalline and more highly amorphous than corresponding catalysts prepared by other methods. Another advantage, which may be related to this, is that these catalysts have better initial activity and better heat stability. All of these characteristics are highly desirable and result in important savings in manufacturing cost and operating expense, in the preparation and use of such catalysts.

In the specific embodiment of the invention herein described, a stable alumina hydrosol prepared by the above method is used in the preparation of a zinc-alumina-molybdena catalyst having these improved properties, by the homogeneous dispersion technique.

In the drawing, Figures I and IA taken together represent one form of apparatus for carrying out the process of the invention. Figure I shows diagrammatically that portion of the apparatus having primarily to do with the preparation of the alumina hydrosol, and Figure IA shows suitable means for the preparation of a zinc-alumina-molybdena catalyst therefrom.

Referring now to the drawing in Figure I, the reference character 10 designates a reactor into which aluminum metal in the form of chips, turnings or the like is introduced through line 12. A catalyst such as mercury salts, mercury, iodine and aluminum halide or the like with mercuric chloride being preferred is introduced into vessel 10 through line 14. The alcohol or alcohol-hydrocarbon mixture is introduced into vessel 10 through line 16. The alcohol is an aliphatic alcohol which is preferably insoluble in water or substantially insoluble in water such as amyl alcohol or higher alcohols or mixtures of such insoluble alcohols. The alcohols employed in the process must be essentially anhydrous. The aliphatic alcohols having 5 or more carbon atoms per molecule are especially useful in the present invention and the higher aliphatic alcohols are suitable provided they are insoluble in water and liquid at the temperature of operation of the process.

While the water insoluble alcohol or mixtures thereof with other alcohols may alone be used to produce aluminum alcoholates according to this process, it is preferred to add to the alcohol a hydrocarbon such as heptane, octane, benzene, toluene, xylene, methylcyclohexene, or mixtures such as a petroleum distillate boiling within the range of 180° to 500° F. It is preferred to use a petroleum distillate of relatively narrow boiling range which boiling range includes the boiling range of the alcohol employed; for example, for use with amyl alcohols a petroleum distillate boiling in the range of 220° to 290° F. is satisfactory.

The addition of the hydrocarbon facilitates the separation of the alcohol from the water. In addition the hydrocarbon diluent aids in controlling the temperature during the reaction and also serves as a solvent for the aluminum alcoholate formed. The mixture preferably contains about 50% of the alcohol and about 50% of the hydrocarbon by volume but the hydrocarbon may range from 0% to 90% of the total volume.

To initiate the reaction, heat is supplied to vessel 10 by a steam coil 18 or other heating means to heat the contents of vessel 10 to about 180° to 300° F. During the reaction hydrogen is given off and this is vented through line 22 and may be recovered because it is pure hydrogen. After the reaction is well started it proceeds at a fast rate and generally cooling will be necessary. The cooling may be done by passing a cooling medium through the coil 18 or other methods of cooling may be used. In a batch-wise type of operation the reaction is continued until the aluminum has gone into solution or for about 30 to 60 minutes.

The reaction may also be carried out in a continuous manner in which it is preferred to maintain at all times a large excess of aluminum metal in reactor 10 and to introduce catalyst through line 14 and alcohol or alcohol-hydrocarbon mixture through line 16 and to withdraw aluminum alcoholate solution through line 23 at a rate which will provide sufficient residence time for the alcohol in reactor 10. An average residence time of about 30 to 60 minutes provides for converting the alcohol to aluminum alcoholate to a desirable degree. Although reactor 10 may be maintained at substantially atmospheric pressure, it may be desirable to maintain reactor 10 under superatmospheric pressure such as 5 to 100 lbs. per square inch gauge, preferably about 25 lbs. per square inch gauge, in order to increase the boiling temperature of the reaction mixture. The reaction of the aluminum with the alcohol is carried out at a temperaure of about 180° to 300° F., preferably about 240° to 270° F.

The reaction products comprising a solution of aluminum alcoholate in hydrocarbon and excess alcohol are withdrawn from tank 10 through line 23 and mixed with a small amount of an organic acid or other peptizing agent such as acetic acid, preferably glacial acetic acid, added through line 24.

Usually about 1 part or less of acetic acid to 3 parts of alumina by weight (calculated as $Al_2O_3$) contained in the alcoholate solution are used, but this ratio may vary between about 1 of acetic acid to 20 of alumina and 2 of acetic acid to 1 of alumina. The amount of acid added can be used to control the clarity and degree of dispersion of the alumina hydrosol subsequently to be formed, and thus to control the particle size and crystallinity of the final catalyst prepared therefrom. The introduction of glacial or anhydrous acetic acid through line 24 provides a substantially anhydrous homogeneous solution of aluminum alcoholate and acetic acid in excess alcohol and hydrocarbon, which solution upon hydrolysis with water, presently to be described, will produce an aqueous phase comprising an alumina sol or hydrosol. All the acetic acid or any desired fraction thereof may be added at once through line 24; alternatively a part or all of the acetic acid may be added with water in the hydrolysis step presently to be described. However, it is preferred to add at least one half of the acetic acid through line 24. For that portion of the acetic acid added with the hydrolysis water the glacial acetic acid has no advantage over the other grades available. While acetic acid is the preferred peptizing agent, other peptizing agents such as formic acid, propionic acid, glycolic acid, lactic acid, tartaric acid, hydrogen chloride, hydrogen bromide, aluminum chloride, aluminum bromide and the like may be used.

After the addition of the acetic acid from line 24, the mixture is passed through line 25 and an orifice mixer 26 where the alcoholate and acid are mixed. The solution of aluminum alcoholate containing acetic acid leaving mixing zone 26 by line 27 is admixed with water introduced by line 32. If desired, a further amount of the acetic acid is introduced with the water by line 28. The resulting mixture is passed through an orifice mixer 34 which functions as a hydrolysis and peptizing zone where the mixture is vigorously agitated. The amount of water used to effect hydrolysis may vary between about 1 part by weight of alumina to 99 parts by weight of water and about 6 parts by weight of alumina to 94 parts by weight of water. Instead of using orifice mixers 26 and 34, other forms of mixing means may be used to obtain the desired agitation. In mixer 34 the alcoholate is hydrolyzed to regenerate the alcohol and to form an aqueous phase comprising alumina hydrosol. The temperature in the hydrolysis zone 34 may be within the range of 60° to 220° F., preferably about 150° to 200° F.

From the second mixer 34 the mixture is passed through line 36 to a settling zone 38 which may be provided with a steam heat coil 42 or other heating means to heat the contents of zone 38, if desired, to about 70° to 210° F., preferably 150° to 200° F. The mixture may also be maintained in zone 38 at a temperature between about 150° and 200° F. for 30 minutes to 5 hours, if desired, to provide an aging or digesting period for the alumina sol. In settling zone 38 the aqueous and organic phases separate with the organic phase forming the top layer which is conducted overhead through line 44 to a dewatering or distillation tower 72 later to be described.

The lower layer comprising acetic acid stabilized alumina hydrosol and residual organic solvents is withdrawn from the lower portion of settling zone 38 through line 48 and passed to the distillation tower 46. In distillation tower 46 the aqueous phase comprising a stable alumina hydrosol is stripped of residual alcohol and hydrocarbons. The alumina hydrosol after this stripping contains about 1% to 8% by weight of alumina and from about 0.1% to 10% by weight of acetic acid. The stable alumina hydrosol is withdrawn for use from the bottom of tower 46 through line 52. It may also be stored as such or may be used for the preparation of alumina gel particles in any desired form or shape. In the present embodiment it is used directly, or after further aging, for the preparation of a zinc aluminate base for hydrocarbon conversion catalysts in the manner described below. If desired, the alumina hydrosol from line 52 may be introduced by line 52a into an aging tank 52b provided with heating means 52c where the alumina hydrosol may be aged for ½ to 10 hours at a temperature of 150° to 212° F. Aged hydrosol is withdrawn from aging tank 52b by line 52d and may be stored as such or used immediately in the preparation of gel particles or finished catalysts.

Heat is supplied to the distillation tower 46 by steam heating coil 54 or other suitable heating means to heat the contents thereof to about 212° F. In tower 46 the residual water insoluble alcohol-hydrocarbon mixture, some water and some acetic acid are separated and passed overhead through line 56 having a condenser 58. The condensed material is passed to separator 62 to separate a lower water layer containing a small amount of acetic acid from a water insoluble upper layer containing the alcohol hydrocarbon mixture. The water layer is withdrawn from the bottom of separator 62 through line 64 and returned either to distillation tower 46 or returned to line 32 through line 65 to the hydrolysis step.

The upper water insoluble layer is withdrawn through line 66 and passed by pump 68 to a dewatering or drying tower 72 provided with a steam heating coil 74 or other heating means. The drying still is heated to about 180° to 300° F. to separate water from the water insoluble alcohol-hydrocarbon mixture. Water vapor containing some alcohol and hydrocarbon with it passes overhead through line 76 provided with a condenser 78 for condensing the vapors and the condensate is passed into settling and separating tank 82 where gravity separation takes place to form a bottom water layer 84 and a top alcohol-hydrocarbon layer 86. The water is withdrawn from the water layer and passed through line 88 by pump 92 into line 32 for reuse in the hydrolysis step. In this way any alcohol and/or hydrocarbon mixed with the water is returned to the system and not lost. The alcohol-hydrocarbon layer is withdrawn through line 94 and returned to the drying still 72 for further drying.

The alcohol-hydrocarbon mixture which has been substantially completely freed of any dissolved or entrained water is withdrawn from the bottom of drying still 72 through line 96 for return to line 16 and vessel 10 for reuse in the process.

Turning now to Figure IA, alumina sol is withdrawn through line 52 or line 52d or from a storage vessel (not shown). This is combined with a stream of a suitable zinc salt solution, such as zinc acetate, withdrawn from storage vessel 102 through line 104.

The combined streams are passed through an orifice mixer or other mixing means 106 and the mixture withdrawn through line 110, to contact with a stream of ammonium molybdate solution withdrawn from storage vessel 108 through line 112. Preferably, the ammonium molybdate solution contains an excess of free ammonium hydroxide approximately stoichiometrically equivalent to the amount of zinc in the stream with which it is mixed. The mixture of alumina sol, zinc acetate solution, and ammonium molybdate solution is passed through orifice mixer or other mixing means 114, and is withdrawn via lines 116 and 120 to dryer 122. The dried product is withdrawn through line 124 to dried catalyst storage vessel 126.

Alternatively, the mixture of alumina sol, zinc acetate solution, and ammonium molybdate solution may be taken from mixing means 114 via lines 116 and 118 to a spray dryer 128 of conventional design to produce a dried product of microspheroidal form. The dried produce is withdrawn from spray-dryer 128 through means 132 to dried catalyst storage in vessel 126.

In another modification of this process, the mixed streams of alumina sol and zinc solution may be withdrawn from mixing means 106 through line 142 passing directly to dryer 144. The product from dryer 144 is withdrawn through conveying means 146 to container 148 where it is contacted and impregnated with a suitable solution of ammonia molybdate withdrawn from storage vessel 108 through line 150. The impregnated mixture is then carried by means 152 to dryer 122 and thence by means 124 to dried catalyst storage vessel 126.

The dried catalyst may then be calcined at a temperature of about 800° to 1200° F. for about 3 to 16 hours, after which it is ready for use.

The following examples are given merely by way of illustration, and the scope of the invention is not to be restricted thereto as changes and modifications may be made without departing from the spirit of the invention.

*Example IV*

About 864 gm. of aluminum turnings are dissolved in about 32 liters of a 50–50% by volume mixture of an anhydrous $C_5$ alcohol mixture and a hydrocarbon oil containing about 6 grains $HgCl_2$. The $C_5$ alcohol mixture contains isomeric amyl alcohols so that the alcoholate formed is a mixed amyl alcoholate. The hydrocarbon oil is a distillate having a boiling range of about 200° to 400° F. Reaction is carried out at a temperature of about 270° F. until all the aluminum metal has dissolved, when 1 cc. of the solution is equivalent to about 0.05 gm. alumina.

About 10 cc. of glacial acetic acid is then mixed with agitation into about 600 cc. of the alcoholate solution, using a propeller type agitator in a beaker. This represents a ratio of acetic acid to alumina of about 1 to 3 by weight. The mixture is then added rapidly with the same type of agitation to 1000 cc. of 1% acetic acid at about 180° F. After about 5 minutes' further agitation the mixture is allowed to settle until a major portion of the alcohol-hydrocarbon mixture separate as an upper layer. This upper layer of alcohol-hydrocarbon mixture is decanted. The remaining lower aqueous layer is digested with slow boiling for about 30 minutes at about 212° F., yielding a translucent stable alumina hydrosol containing about 3% alumina and about 2% acetic acid.

*Example V*

About 864 gm. of aluminum turnings plus about 0.5 gm. $HgCl_2$ are dissolved in about 32 liters of a 50–50% by volume mixture of a hydrocarbon fraction and anhydrous Pentasol (Sharples Chemicals, Inc.). The Pentasol is a mixture of isomeric $C_5$ aliphatic alcohols. The hydrocarbon fraction is a distillate having a boiling range of about 200° to 400° F. The resulting amyl alcoholate solution is then hydrolyzed with a solution of about 520 cc. of glacial acetic acid in about 55 liters of water (about 1% acetic acid by weight) at 175° F.

The hydrolysis is performed by pumping the two solutions in a controlled ratio of about 55 parts by volumes of acetic acid solution to 32 parts by volume of the alcoholate solution, discharged simultaneously on the impeller of a centrifugal pump to produce rapid mixing. The mixture is discharged to a large separatory funnel, where it rapidly breaks to an upper organic liquid layer and a lower aqueous layer comprising a milky alumina hydrosol.

The alumina hydrosol is then charged to a still pot and refluxed under a still-head which returns the aqueous overhead to the pot. The organic overhead is removed and added to the alcohol-hydrocarbon fraction previously recovered, to be recycled to the aluminum alcoholate preparation step after suitable dewatering or drying. During this refluxing treatment the temperature was maintained at about 212° F. for about 30 minutes. The still bottoms comprise an alumina hydrosol of excellent translucent appearance, with no evidence of sediment or settling.

*Example VI*

About 27 grams of aluminum turnings plus about 0.1 gram of mercuric chloride plus about 0.1 gram of iodine are dissolved in 600 cc. of anhydrous isopropyl alcohol. The mixture is heated under reflux to initiate the reaction, but after the reaction is well started it is necessary to provide cooling and finally the mixture is again heated under reflux to complete the reaction. About 1½ hours are required to complete the reaction between the aluminum and the isopropyl alcohol. After completion of the reaction about 5 cc. of glacial acetic acid is added to the solution of aluminum isopropylate in excess isopropyl alcohol. Immediately thereafter, the solution is added with vigorous agitation to 2000 cc. of water which has been heated to 150° F., thus forming an alumina sol. The isopropyl alcohol is distilled overhead from the alumina sol leaving a bottoms comprising an alumina hydrosol of about 3% concentration. The recovered isopropyl alcohol may be dehydrated for reuse in converting more aluminum metal to aluminum isopropylate.

*Example VII*

95.3 liters of a 3.15 wt. per cent alcoholate alumina hydrosol (equivalent weight 3005 g. $Al_2O_3$) is mixed with 21.35 liters of zinc acetate solution sp. g. 1.15 (equivalent weight 2395 g. ZnO).

This impregnated hydrosol is mixed by contacting on the impeller of a centrifugal pump with 55 liters of solution containing 732 g. of ammonium molybdate (600 g. $MoO_3$) and 1000 g. $NH_3$ (equivalent to the zinc acetate). The flow rates of the two solutions to the mixing unit are controlled to yield a homogeneous product comprising on a dry basis 90% $ZnO.Al_2O_3$–10% $MoO_3$. The mixture sets to a soft white hydrogel within seconds after mixing. This hydrogel is dried in a forced draft steam oven at ca. 250° F., to about 20% volatile content.

*Example VIII*

Duplicate of Example VII, prepared to check the reproducibility of the excellent activity exhibited by the first preparation.

*Example IX*

99 liters of a 2.8 wt. per cent alcoholate alumina hydrosol (2790 g. $Al_2O_3$) are agitated and mixed with 23 liters of zinc acetate solution, sp. g. 1.132 (2210 g. ZnO). The mixture is agitated 10 minutes, aged 2 hours, and dried to a volatile content of about 20% in a forced draft steam oven at about 250° F.

The dried zinc-alumina mixture is calcined 24 hours at 1100° F. 5506 g. of the dried and activated product is then made into a paste with a solution of 692 g. ammonium molybdate (568 g. $MoO_3$) dissolved in 4.8 liters water, and thoroughly mixed. The mixed paste is dried in a forced draft steam oven at about 250° F., giving a catalyst having the same nominal composition of 90% $ZnO.Al_2O_3$–10% $MoO_3$.

*Example X*

Semi-works scale preparation of 90% $ZnO.Al_2O_3$–10% $MoO_3$ catalyst, by previous conventional procedure:

Solution A:
    617 lbs. Tech. zinc sulfate
    135 lbs. 98% sulphuric acid
    382 gals. water Solution B:
    797 lbs. sodium aluminate
    450 gals. water Solutions A and B are added simultaneously to 100 gallons of water, while the water is being agitated. Agitation is continued 4–5 mniutes after addition is complete.

The final pH is 10–11, and sulfuric acid is added to adjust this pH to 8. The slurry is filtered on a filter press. The cake is washed with about 36 gallons of water per gallon of cake, and air blown from the filter press. The cake is reslurried with a solution of 61 lbs. of ammonium molybdate in 400 gallons of water, to form 500 gallons of thick slurry. The mixture is dried in a steam oven at 300° F. to about 15% volatile content. The catalyst is calcined at 1150° F. for about 5 hours.

The catalysts prepared in Examples VII through X are all useful for the hydroforming of naphthas for octane number improvement. Standard tests for the comparison of hydroforming catalyst activity may be carried out by charging a 200 to 330° F. end point virgin naphtha over a fixed bed comprising 2 liters of catalyst in the form of 3/16" by 3/16" cylindrical tablets, at 200 p. s. i. g. and 900° F., feeding 1500 cubic ft. of cylinder hydrogel per barrel of oil feed. The severity in each case can be controlled by controlling the feed rate, to give a $C_5$ to 430° F. end point product having a CFR-Res. clear octane No. which has been raised from the 50 O. N. of the feed to a value of 95.0. By carrying out the tests in this manner, the feed rates required provide a measure of the activity of the different catalysts. The following tabulation presents the feed rates required to give a 95 octane number produce for the four example catalysts.

| Example Catalyst | Feed Rate, Vols. Liquid Oil/Vol. Catalyst/Hour |
| --- | --- |
| VII | 0.38 |
| VIII | 0.38 |
| IX | 0.38 |
| X | 0.19 |

These data show that each of the three Examples VII, VIII and IX embodying this invention is approximately twice as active as the conventional catalyst described in Example X. In each of these four tests, the product distribution at the 95.0 octane level of severity is found to be approximately the same.

Typifying the versatility of the present invention, a modification described in the following example yields a catalyst of somewhat lower activity, but improved selectivity to useful products in the hydroforming reaction.

*Example XI*

56 liters of a 3% alcoholate alumina sol (1175 g. $Al_2O_3$) is mixed with 16.7 liters of zinc acetate solution sp. g. 1.117 (1335 g. ZnO), and 1.53 liters of calcium nitrate solution, sp. g. 1.180 (136 g. CaO). This impregnated hydrosol is then mixed by contacting on the impeller of a centrifugal pump with a solution of 427 g. ammonium molybdate (350 g. $MoO_3$) and 459 g. ammonia in about 36 liters water. The flow rates of the two streams are adjusted to give a product comprising on a dry basis, 10% $MoO_3$–3.9% CaO–86.1% $ZnO.Al_2O_3$. The mixture sets rapidly to a soft white hydrogel which may be dried and calcined to yield a finished catalyst of the stated composition.

This type of preparation may also be carried out substituting chromia for molybdena, and other promoters such as potassium or cerium may be added if desired. The amount of excess ammonia added, if any, may be enough to cause precipitation and coagulation of hydrous zinc oxide and alumina hydrogel, but the mixture will set spontaneously on standing for from about 5 minutes to an hour so that excess ammonia is not always required.

The above examples have been described using zinc acetate as the preferred source of the zinc entering the catalyst composition. While zinc acetate has been found to give very satisfactory results in these preparations, it will be understood that the present invention is not limited thereto. One essential requirement for a suitable zinc solution is that it must not adversely affect the stability of the sol and setting rate of the mixture so as to give a non-homogeneous dispersion on combining the alumina hydrogel and zinc solution. This directs attention to the monovalent anions. A polyvalent ion such as the sulfate gives a quick-setting gel which makes it more difficult to get a completely uniform dispersion of the catalyst materials endangering an important advantage of the present invention. It is also important that the residue, if any, of the zinc salt be a material which is easily volatilized from the finished catalyst. Zinc nitrate may be used in certain cases as well as zinc acetate. Zinc chloride, however, is not as satisfactory since the chloride ion tends to be more difficult to remove from the finished catalyst.

An alternate method of introducing zinc involves the preparation of a solution of zinc amine hydroxide. Zinc oxide in solid form or a precipitated slurry of zinc hydroxide is not suitable, since neither of these materials will give a uniform dispersion of zinc throughout the alumina on forming the zinc aluminate catalyst base. Zinc amine hydroxide is water soluble however, and it contains no involatile impurities. A solution of this compound may be prepared, for example, by adsorbing zinc ion on a cation exchange resin, washing the resin and elutriating the zinc ion from the resin with an excess of ammonia. The zinc amine solution prepared in this way can be intimately mixed with an alumina hydrosol to form a homogeneous dispersion nn the same manner as the zinc acetate solution previously described, whereupon the mixture sets shortly to a hydrogel. In any of these alternate cases, the zinc-alumina mixture may be impregnated either before or after setting, or after drying and activation, as described above, to give a finished catalyst of the desired composition.

What is claimed is:

1. A method for preparing improved catalysts for hydroforming conversion which comprises mixing anhydrous aluminum alcoholate with an anhydrous peptizing agent selected from the group consisting of acetic acid, formic acid, propionic acid, glycolic acid, lactic acid, tartaric acid, hydrogen chloride, hydrogen bromide, aluminum chloride and aluminum bromide, adding water to the resulting mixture to hydrolyze the alcoholate and regenerate the alcohol at a temperature between about 60 and 220° F., separating a stable alumina hydrosol from the digested mixture, mixing said alumina hydrosol with a zinc-containing solution free from polyvalent anions to form a homogeneous zinc-alumina hydrosol, combining the zinc-alumina hydrosol with an ammonium molybdate solution, setting the resulting mixture to a hydrogel and drying the hydrogel to form a zinc-alumina-molybdenum oxide catalyst having uniform composition throughout.

2. The method according to claim 1 in which the peptizing agent is glacial acetic acid and is used in a weight ratio of acetic acid to alumina of less than 1:3.

3. The method according to claim 2 in which the said hydrosol has an alumina content in excess of 3% by weight.

4. The method according to claim 1 in which the peptizing agent is glacial acetic acid and the zinc containing solution is an aqueous solution of zinc acetate.

5. The method according to claim 1 in which the ammonium molybdate solution contains an amount of excess ammonia which is stoichiometrically equivalent to the amount of zinc in solution.

6. The method according to claim 1 in which said zinc-alumina hydrosol is allowed to set spontaneously to a hydrogel prior to the addition of the ammonium molybdate solution.

7. A continuous method for preparing a zinc-alumina base for hydrocarbon conversion catalysts which comprises mixing a stream of anhydrous aluminum alcoholate derived from an alcohol which is substantially insoluble in water with a stream of an anhydrous peptizing agent selected from the group consisting of acetic acid, formic acid, propionic acid, glycolic acid, lactic acid, tartaric acid, hydrogen chloride, hydrogen bromide, aluminum chloride and aluminum bromide, vigorously mixing a stream of water with the resulting mixture to hydrolyze the alcoholate and regenerate the alcohol at a temperature between about 60 and 220° F., separating a stable alumina hydrosol from the digested mixture, thoroughly mixing a stream of said alumina hydrosol with a stream of a zinc-containing solution free from polyvalent anions and which contains an amount of zinc stoichiometrically equivalent to the amount of alumina in said stream to form a homogeneous zinc-alumina hydrosol, converting the resultant hydrosol into a zinc-alumina hydrogel and drying the resultant hydrogel to form a product having the uniform, nominal composition of zinc aluminate throughout.

18. The method according to claim 7 in which the homogeneous zinc alumina hydrosol is combined with a solution of at least one additional catalytic component prior to conversion of the hydrosol to hydrogel.

References Cited in the file of this patent

UNITED STATES PATENTS

| | | |
|---|---|---|
| 1,782,857 | Miller et al. | Nov. 25, 1930 |
| 2,453,847 | Kimberlin | Nov. 16, 1948 |
| 2,474,215 | Kearby | June 28, 1949 |
| 2,503,168 | Patrick | Apr. 4, 1950 |
| 2,582,254 | Hunter | Jan. 15, 1952 |
| 2,636,865 | Kimberlin | Apr. 28, 1953 |
| 2,595,339 | Herder | May 6, 1952 |
| 2,656,321 | Hunter | Oct. 20, 1953 |